C. S. BARRELL.
SWIVEL DEVICE.
APPLICATION FILED MAR. 20, 1916. RENEWED MAY 21, 1919.

1,327,013.

Patented Jan. 6, 1920.

Inventor:
Charles S. Barrell.
By Henry J. Miller
atty.

UNITED STATES PATENT OFFICE.

CHARLES S. BARRELL, OF BOSTON, MASSACHUSETTS.

SWIVEL DEVICE.

1,327,013.     Specification of Letters Patent.     Patented Jan. 6, 1920.

Application filed March 20, 1916, Serial No. 85,300. Renewed May 21, 1919. Serial No. 298,822.

*To all whom it may concern:*

Be it known that I, CHARLES S. BARRELL, a citizen of the United States, residing at Boston, in the county of Suffolk and State of Massachusetts, have invented new and useful Improvements in Swivel Devices, of which the following is a specification, reference being had to the accompanying drawings, forming part thereof.

This invention has reference particularly to improvements in securing members for securing the cross chains of a tire chain to the side chains.

The objects, generally, of the invention are to provide a securing member of this character which, although extremely simple, in construction, is highly efficient.

Referring to the drawings.

Similar numerals of reference designate corresponding parts throughout.

Figure 1:
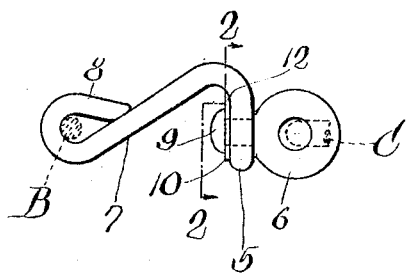
Figure 1, represents a side view in elevation of a securing member embodying my invention.
Figure 2:
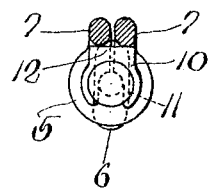
Fig. 2 represents a sectional view taken on line 2—2 of Fig. 1.
Figure 3:
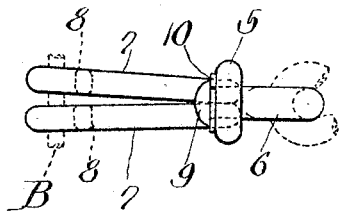
Fig. 3 represents a bottom plan view of the securing member.

The securing member represented in the drawings comprises a wire of suitable cross sectional shape and size bent upon itself intermediate the ends thereof to form the collar or eye 5 which embraces the shank of the link 6 at the ends of the cross chain C, and arms or portions 7, 7 projecting in the present instance from said collar or eye 5 at angles thereto and having ends or terminals 8, 8 which are adapted to be bent or closed around the side bar B of a link of the side chain. At the end of the shank of the link 6 is the head 9. Between the latter and the collar 5 is placed the hardened bearing plate 10 having the slot 11 to receive the shank of link 6 and the end 12 which is engaged by the arms 7, 7 to prevent the rotation of said plate 10.

In order to increase the wear of the cross chains and the swiveled end links 6, it is desirable that these parts be hardened, while it is preferred that the securing members should be sufficiently malleable to facilitate their being bent into engagement with links of the side chains without the necessity of removing the side chains from the tire. I, therefore, prefer to make the securing members of metal which may be bent at a point to embrace the shank of the link 6 and at other points to engage the links of the side chains, and, in order to reduce or prevent the wear of the heads 9 directly on the malleable metal of the securing members, I introduce between said head 9 and the collar 5 of said securing member, a bearing plate 10 of hardened metal.

The ends of the arms 7, 7 which are correspondingly bent about a bar of the side chain furnishes a comparatively wide bearing surface whereby the securing member is prevented from twisting.

Figure 4:
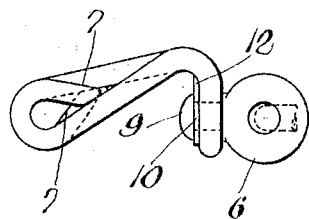
Fig. 4, represents a view similar to Fig. 1 of a modification.

Another manner of attaching the securing member is shown in Fig. 4, in which the arm 7 is bent down over the link of the side chain and the other arm is bent up over the link, the same as both arms are bent in my preferred form as represented in the preceding figures.

It will be understood that the invention is not limited to the specific embodiment shown, and that various deviations may be made therefrom without departing from the spirit and scope of the appended claims.

Having thus described my invention I claim as new and desire to secure by Letters Patent—

1. A securing member of the character described comprising a member formed of wire bent upon itself, to form a bearing collar for the shank of a link and a pair of hooked members extending at angles from said collar adapted to be bent to grip a side chain of a tire chain.

2. In combination with a link provided with a shank having a head, of a securing member of the character described comprising a wire bent upon itself to form a bearing collar for said shank and a member extending from said collar and adapted to be attached to a side chain of a tire chain, and a hardened bearing between said collar and said head.

3. In combination with a link provided with a shank having a head, of a securing member, of the character described, comprising a wire bent upon itself to form a bearing collar for said shank and an arm extending from said collar and adapted to be attached to a side chain of a tire chain, and a hardened bearing plate for the head of said shank located between said collar and said head, said bearing plate prevented from turning by the engagement of an end thereof with said arm.

4. In combination with a link provided with a shank having a head, of a securing member of the character described provided with a bearing collar at one end for said shank, and an arm extending from said collar and furnished with a hooked end for engagement with a side chain.

5. In combination with a link provided with a shank having a head, of a securing member of the character described provided at one end with a bearing collar for said shank, a separate hardened bearing for the head of said shank located between said head and said collar, and an arm extending from said collar and provided with an end adapted to be attached to a side chain.

6. A securing member of the character described comprising a wire bent to form a bearing collar for the shank of a swivel link and a pair of hook members extending at angles from said collar, all substantially as described.

7. A securing member for the cross chain of a traction device for a tire comprising a wire bent intermediate the ends thereof to present an eye for connection with a cross chain, said wire having portions projecting from said eye with reversely bent terminals forming an eye for connection with a side member of the traction device.

8. A securing member comprising a wire bent to present an eye intermediate the ends of the wire, said wire having end portions bent back toward the body of the wire to form an eye in a plane different from the plane of the intermediate eye.

9. A securing member comprising a wire bent to present an eye intermediate the ends of the wire, said wire having portions projecting from said eye provided with terminals adapted to be bent about a member back toward said portions to form an eye to receive said member.

10. The combination with a swivel member for a cross chain of a traction device for a tire, of a hook member having an eye engaging said swivel member and a pair of eyes receiving a side member of the traction device.

CHARLES S. BARRELL.